Oct. 18, 1938.  L. M. McCORMICK  2,133,302
ARCH SUPPORT, LOCATOR, AND RETAINER
Filed May 7, 1935  3 Sheets-Sheet 1
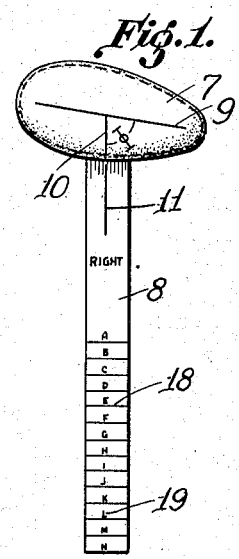
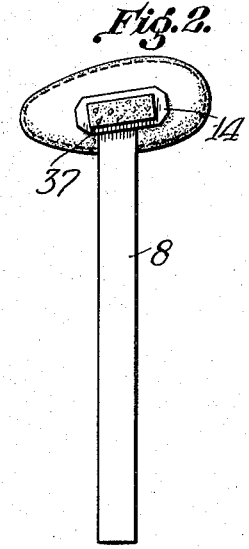
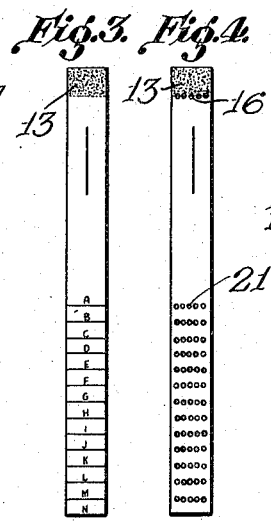
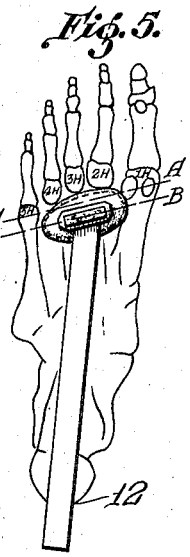
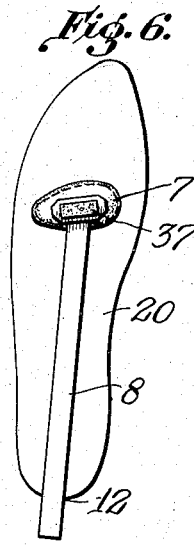
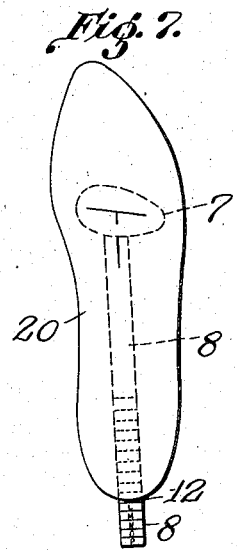
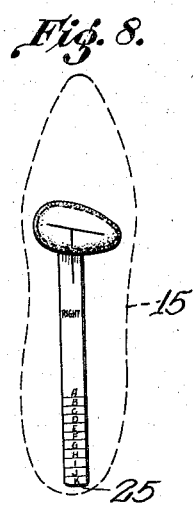
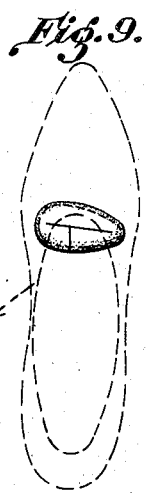
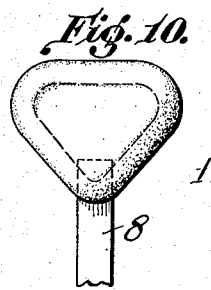
Inventor:
Lewis M. McCormick Oct. 18, 1938.  L. M. McCORMICK  2,133,302
ARCH SUPPORT, LOCATOR, AND RETAINER
Filed May 7, 1935  3 Sheets-Sheet 2
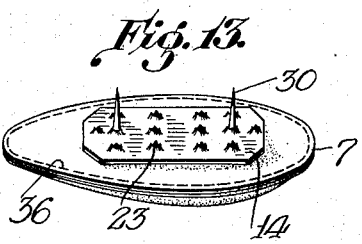
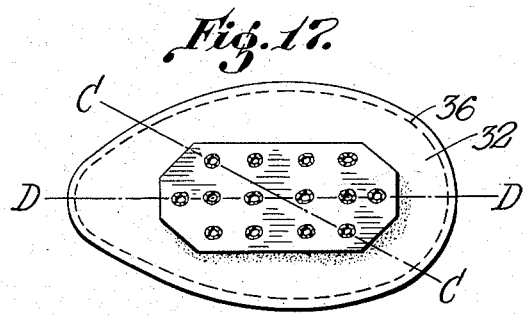
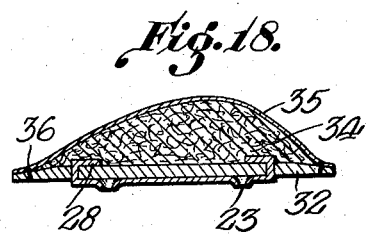
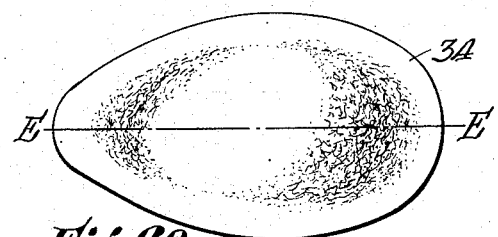
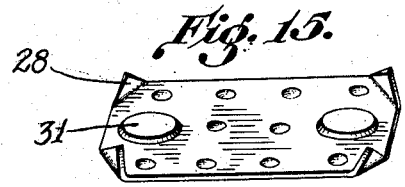
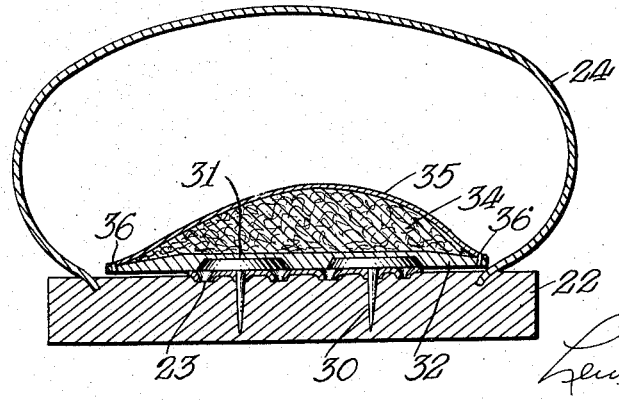
Inventor:
Lewis M. McCormick Oct. 18, 1938.　　　L. M. McCORMICK　　　2,133,302
ARCH SUPPORT, LOCATOR, AND RETAINER
Filed May 7, 1935　　　3 Sheets-Sheet 3
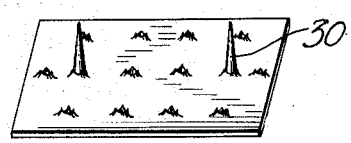
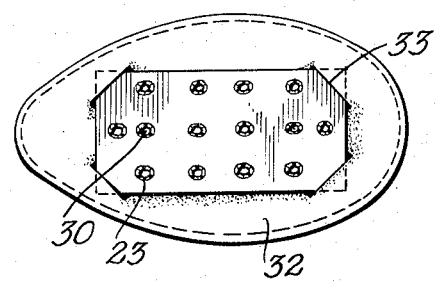
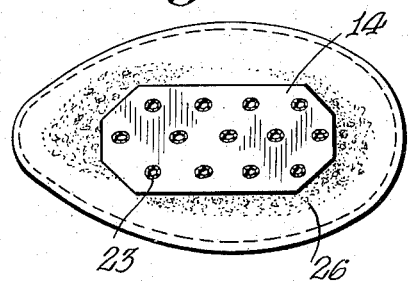
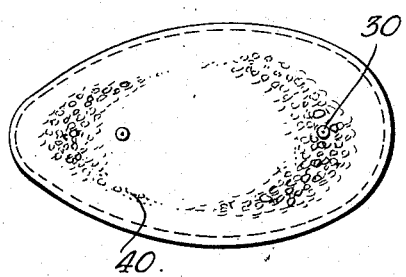
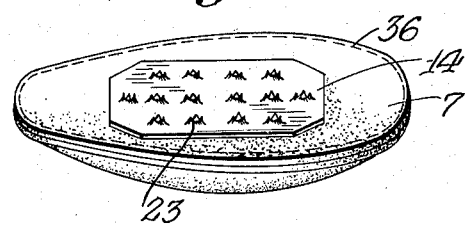
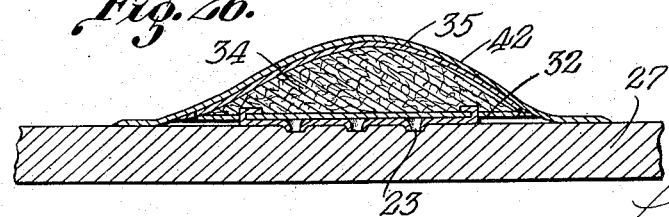
Inventor:
Lewis M. McCormick Patented Oct. 18, 1938

2,133,302

UNITED STATES PATENT OFFICE 2,133,302

ARCH SUPPORT, LOCATOR, AND RETAINER

Lewis M. McCormick, Palo Alto, Calif.

Application May 7, 1935, Serial No. 20,215

8 Claims. (Cl. 36—71)

My invention relates to an arch support, measuring and locating means and retainer, and more particularly to a means to locate and retain a flexible pad or the like in proper position in the shoe with respect to the metatarsal arch of the foot.

Metatarsal arch supports of the types which are commonly placed in the shoe at random and fastened to the sole by means of tacks, glue, or rubber cement seem to have many objectionable features:

First, it is exceedingly difficult, if not impossible, to place a pad on the sole of the shoe at a point that it will come to lie just back of the heads of the metatarsal bones of the foot when the shoe is worn without some means to indicate the position thereof. This factor is of the utmost importance from the surgical standpoint.

Second, it is folly to attempt to fully retain a pad, properly placed, by the use of glue or rubber cement. The general moisture and body heat tend to destroy the adhering qualities of the gum and permit the pad to shift too far back relative to the arch to be of any value as a support.

Third, it requires too much time and effort on the part of the operator to prepare dry clean surfaces for the adhesive coatings and the setting of same before the operation is complete, especially on an article which must sell for a small fee.

Fourth, tacks alone are not satisfactory in securing a pad to the sole because the impacting action of the ball of the foot against the pad in the act of walking shifts the same back and forth along the sole until the holes made by the prongs of the tacks in the sole become so enlarged that full displacement of the pad is anticipated.

It is therefore an object of my invention to provide a measuring and locating means by which even a layman is able to quickly and accurately predetermine the exact location of a pad to be placed on the sole of the shoe at a point beneath the metatarsal arch of the foot.

Another object of my invention is to provide a means to locate preferably an elongated metatarsal pad across the sole of the shoe that the longitudinal axis of the pad shall lie approximately parallel with a line passing through points over the first and fifth heads of the metatarsal bones of the foot when the shoe is worn. By the use of an egg-shaped pad with its smaller end disposed to the outer side of the shoe the above method permits a forward portion of the pad to lie just back of the metatarsal heads.

A further object of my invention is to provide an arch support, with means adapted to make an interlocking engagement with the sole of a shoe to prevent the shifting of the same relative to the sole when external force is exerted against the pad.

Another object of my invention is to provide an arch support with means characterized by having a plurality of forms adapted to make corresponding indentures in the ordinary sole material of a shoe whereby an interlocking engagement is formed. This engaging medium prevents the shifting of the pad along the sole caused by external impacts against the same by the ball of the foot in the act of walking and auxiliary means adapted to hold the engaging means in contact with the sole.

Another object of my invention is to provide a means whereby an arch support is quickly and firmly secured in place on the sole of a shoe irrespective to the adverse effects of moisture and heat.

A further object of my invention is to preferably provide an egg-shaped pad of suitable shape and adapted to support the metatarsal arch of the foot. An engaging means, preferably constructed in the pad during the manufacturing of the same, adapted to prevent the shifting of the pad along the sole, and auxiliary means adapted to hold the engaging means in contact with the sole. The engaging and auxiliary means combine to form the pad retainer.

The arch support, measuring and locating means, and retainer is shown by way of example in the accompanying drawings, in which:

Fig. 1 is a top view of an arch support, a measuring and locating means angularly attached to the pad by controlling means or indicators as designated by the angle of attachment, graduated means with characters on the measuring and locating means and the word Right.

Fig. 2 is a bottom view of the arch support and measuring and locating means as shown in Fig. 1. It shows a means attached to the pad to secure the pad to the sole of a shoe, together with a detachable guard 37 for tack prongs 30.

Fig. 3 is a plan view of the measuring and locating means as illustrated in Fig. 1 and adapted to be attached to a pad. It shows an end surface of adhesive gum, an indicator to control the angle of attachment with the pad, graduations accompanied by characters and with the word Right.

Fig. 4 is a modified measuring and locating means differing from that shown in Fig. 3 in that the graduations are perforated and without characters. It is also perforated at one end along the border of the adhesive gum.

Fig. 5 is a bottom view of the bones of the right foot, an egg-shaped pad positioned, a measuring and locating means attached to the pad, and a guard for the tack prongs.

Fig. 6 is a bottom view of the right foot with a stocking on, a pad positioned as shown in Fig. 5, a measuring and locating means attached to the pad in a detachable manner and in position for measuring the foot, a retainer also attached to the pad, and a detachable guard 37 for the tack prongs 30.

Fig. 7 is a top view of the right foot with a stocking on, an outline of a pad and a portion of the measuring and locateing means positioned as in Fig. 6, and a disposable end portion of the measuring and locating means extending beyond the heel.

Fig. 8 shows a phantom top view of a right shoe, a pad, the measuring and locating means detached at the point of measurement 25 and both measuring and locating means and pad placed in the shoe.

Fig. 9 shows a phantom top view of a right shoe with the pad properly placed and with its measuring and locating means detached.

Fig. 10 is a top view of a covered modified form of pad having a measuring and locating means attached to it.

Fig. 11 shows a top view of another type of pad, a modified locator associated therewith with an adhesive gum on a surface thereto.

Fig. 12 illustrates the same set-up as shown in Fig. 1, but with reversed angle of attachment so that it becomes adapted for the left foot as indicated by the word Left.

Fig. 13 is a bottom perspective view of an egg-shaped pad, and a retainer for same attached thereto having tacks.

Fig. 14 a perforated engaging means viewed from the bottom and showing the plurality of spurs 23 projecting integrally from the plate.

Fig. 15 shows a top view of the engaging means as illustrated in Fig. 14, with its corners turned up for clamping purposes, and tacks or auxiliary means installed.

Fig. 16 is a side view of a tack or auxiliary means as illustrated in Figs. 13 and 15.

Fig. 17 shows a bottom view of the preferred pad, retainer, and tacks.

Fig. 18 is a section on line C—C of Fig. 17.

Fig. 19 is a section on line D—D of Fig. 17, and its application to a cross-section of a shoe.

Fig. 20 is a bottom view of the preferred shape of pad which is egg-shaped, and uncovered.

Fig. 21 is a section on line E—E of Fig. 20.

Fig. 22 illustrates an engaging means with its corners flat and with tacks as viewed from the bottom.

Fig. 23 shows the retainer illustrated in Fig. 22 attached to a pad by its corners inserted through the slots provided in the bottom of the pad.

Fig. 24 illustrates a bottom view of the engaging means as shown in Fig. 14, attached to the bottom of the pad, and glue or other suitable auxiliary means placed on the bottom of the pad around the engaging means.

Fig. 25 shows a bottom view of a modified retainer in the form of grit-like particles or engaging means 40 secured to the bottom surface or plate of a pad. Tacks 30 or auxiliary means may be used.

Fig. 26 is a section of a sole of a shoe showing an engaging means similar to that in Fig. 27 attached to a pad. A cover slip 42 is used to hold the engaging means in contact with the sole.

Fig. 27 illustrates an engaging means similar to those shown in Figs. 14 and 24 attached to a pad as shown in Figs. 13 and 18, and adapted to make an interlocking engagement with the sole of a shoe.

Referring more particularly to the accompanying drawings, I prefer to provide a flexible pad 7 of suitable size and material, preferably egg-shaped horizontally, but it may be of any shape. A measuring and locating means 8 is attached to the pad in any suitable manner. It is preferred that the measuring and locating means be made from a multiple ply Bristol board or any paper-like or easily detached material but not necessarily so, and made in any required dimensions. It is preferred that it be adapted to measure the distance from a pad applied to the region of the ball of the foot, to a point just back of the heel 12, to predetermine the location of the pad to be placed on a sole in a shoe at a point beneath the metatarsal arch of the foot. The Bristol board gives sufficient body to the measuring and locating means that it may be used as a convenient manual means to support the pad in measuring the foot to predetermine the location of the pad in the shoe and in locating or placing the same therein as described later. The measuring and locating means may be made from a thin ribbon-like material as shown in Fig. 11. It may be coated with an adhesive gum 17 on a surface and after measuring the foot and locating the pad in the shoe it may be adhered to the sole or detached in any desired manner.

To assemble the two parts, the adhesive surface 13 is usually moistened. This end is moved into the slot formed by the retainer 14 and the pad, with the adhering surface facing the bottom of the pad. The adhesive is not used in cases where the embracing effects of the slot are adequate to support the measuring and locating means in position. This manner of assemblage illustrates a movable attachment between the pad and the measuring and locating means. The two parts are adjusted until the indicators represented by lines 10 and 11 on the pad and measuring and locating means respectively, as shown in Fig. 1, are brought into an alignment with each other and the end of the indicator 11 brought to a point flush with the edge of the pad. In this respect the indicators control the angle of attachment designated by the acute angle Φ in Fig. 1, or acts as a controlling means for the attachment between the pad and measuring and locating means, the practical value of which is illustrated in Fig. 5. Line B—B is equivalent to line 9 in Fig. 1 which represents the longitudinal axis of the pad. With the pad in the position as shown in Figs. 5 and 6 and with the measuring and locating means extending rearwardly and centrally over the heel, a forward portion of the pad will come just back of the second, third and fourth metatarsal heads. The longitudinal axis of the pad B—B in Fig. 5 or line 9 in Fig. 1 will be approximately parallel with the line A—A in Fig. 5 passing through points lying over the first and fifth metatarsal heads.

While it is desired to have such indicators provided, they can be eliminated by a certain factory means to control the angular attachment in the process of manufacture.

Figs. 10 and 11 illustrate the attachments of measuring and locating means to pads with no consideration of the angle referred to above.

It is desired that the pad and measuring and locating means be attached in a freely detachable manner by using a suitable adhesive gum 13 applied to an end surface as shown in Figs. 3 and 4. The adhesive being of such a strength that it will normally hold the pad and measuring and locating means together while at the same time permitting the detachment thereof by pulling lightly upon the measuring and locating means. It may be desired to perforate the measuring and locating means along the line 16 bordering the adhesive gum 13, as shown in Fig. 4 when detachment can be made by tearing it off at this point.

It is preferred that the measuring and locating means be graduated with bars 18 and provided with characters 19 or other suitable means to indicate the point of measurement but the measuring and locating means may be in the blank as shown in Fig. 10 and Fig. 11, or without characters as shown in Fig. 4. The importance of the graduated bar with characters is not only the convenience in making the measurement of the foot 20 but once the foot measurement is ascertained and the character memorized all future pads may be installed in the shoe without further measurements. I prefer to use the measuring and locating means without perforated graduation 21 as illustrated in Fig. 4 as the same lessens the body of the measuring and locating means to the extent that the manual means for handling the pad is sacrificed. A cork guard 37 is placed over the points of the tacks 30 to protect the user during the measuring operations.

In practical operation, the top surface of the pad 7, as shown in Fig. 1, is pressed against the bottom of the foot 20 in the region of the ball of the foot, by gripping the cork guard 37 with the fingers, as indicated in Fig. 6, usually over a stockinged foot. The pad is adjusted just back of the middle three metatarsal heads as shown in the skeleton of the foot in Fig. 5. The heads are easily palpated through the flesh and the location of the pad identified. The callus or tender spots over the region of the metatarsal heads also may act as a guide in locating the pad in the correct position. The free end of the measuring and locating means is adapted to extend rearwardly from the pad so positioned and is disposed centrally over the heel and beyond the same as illustrated in Fig. 6. The point of measurement is checked on the measuring and locating means 8 at a point thereon flush with the back of the heel 12. That portion of the measuring and locating means extending beyond the point of measurement to the end thereof may be disposed of by detaching it or bending it back upon itself as desired.

If it is desired, the measurement may be made by the wearer laying the pad 7 on the floor facing up and stepping on the pad as shown in Fig. 7 with the free end of the measuring and locating means 8 extending back from the heel 12 in midline therefrom. When the pad 7 seems to be located at a point where the desired lift or support is determined by the wearer it is checked on the measuring and locating means, as before, at a point flush with the back of the heel 12. That portion of the measuring and locating means beyond the point of measurement to the end to be disposed of as above.

The pad and measuring and locating means as used for the required measurement are now placed in the shoe facing up as shown in Fig. 8 where a phantom right shoe is illustrated. The cork guard 37 is removed from the tack prongs and the torn off end edge of the measuring and locating means, indicating the point of measurement, is now placed so as to abut the inside heel portion of the shoe at a point most rearwardly thereof, as shown in Fig. 8. While this end is supported thereto the pad 7 is centrally located in a lateral manner relative to the sole of the shoe and secured at this point by forcing the tack prongs 30 into the sole until the spurs 23 contact the sole of the shoe, or secured by any other means. After the pad is thus positioned, it is temporarily supported by the hand until the measuring and locating means is detached therefrom by pulling slightly upon the means. The operation is now complete and the shoe is ready to wear.

Fig. 12 represents a pad of the same shape and structure as in Fig. 1 and with a portion of the measuring and locating means attached therewith. It is for the left foot, while that in Fig. 1 is for the right foot. They are differentiated by the fact that the acute angles designated by $\Phi$ point in opposite directions as indicated in the two figures.

To retain a pad in position in relation to a sole of a shoe, I prefer to use a suitable means attached to the pad in a desired maner and provided with a plurality of spurs adapted to make an interlocking engagement with the sole of the shoe. I prefer that these spurs be held in contact with the sole by a suitable auxiliary means, but it is to be understood that the auxiliary means is not necessarily needed to make the retainer a practical success.

The preferred engaging means is manufactured from a small plate preferably of hard thin sheet metal, Figs. 14 and 15, such as bronze, German silver, steel or any other suitable material and made in any required dimensions. The plate is perforated in such a manner that preferably a plurality of lip-like spurs 23, in spaced relationship, are formed integrally with the plate. The corners are usually bent to form clips 28. The plate is usually provided with openings 29 through which the prongs 30 of the tacks or other means are led as shown in Figs. 15 and 22 and their heads preferably soldered thereto.

Fig. 20 shows the preferred shape of pad, which is egg-shaped horizontally as illustrated here and in Figs. 1 and 2. This or any shape of pad may be attached to the measuring and locating means as illustrated in Figs. 1, 10 and 11. The above pads may be made of any kind of suitable material to support the metatarsal arch of the foot. They may be completely covered as shown in Figs. 1, 17 and 19 where 32 is the bottom cover and 35 is the top cover, 36 is the sewing, or just a top covering as shown in Figs. 10 and 11, or without any covering as shown in Figs. 20 and 21.

The various pads above described may be secured to the sole of the shoe by glue, cement, or any of the various retainers described herein or any combination of the same.

Fig. 21 shows a longitudinal section cut on the line E—E as shown in Figs. 20 and 19. This vertical shape is preferred as described herein but any desirable vertically shaped pad may be used in the manner as discussed above.

The retainer as shown in Figs. 13, 22 and 24 may be attached to a piece of leather or any suitable material. Slots 33 may be made in the above material through which the corners may be moved and secured thereto. The leather piece or the bottom cover 32 carrying the retainer is then secured to the bottom of the pad by glue or any other suitable means.

Fig. 22 illustrates a modified form of retainer where the corners are left flat and inserted through the slots 33 in Fig. 23 by temporarily bowing the retainer to permit the corners to be moved through the slots.

Fig. 24 shows a similar engaging means to that in Fig. 14 which may be attached to a pad as in Fig. 13. Here glue 26 or other suitable means may be used to hold the forms 23 of the engaging means 14 in contact with the sole of the shoe.

Fig. 25 illustrates a modified form of retainer where grit-like particles 40 or sand or any suitable elevations are secured to the bottom of the pad which I call the plate or a portion thereof by any suitable means. Tacks 30 may be used as shown.

Fig. 26 is a cross-section of a pad and retainer similar to that in Fig. 18, and a section of a sole of a shoe 27. Here a modified auxiliary means to hold the spurs 23 of the engaging means in contact with the sole is represented by a suitable piece of thin leather 42 or other covering placed over the pad or in such other manner as to function in the desired way.

Fig. 27 illustrates an engaging means similar to those shown in Figs. 14 and 24. It is attached to a pad in any desired manner. The spurs 23 are adapted to retain the pad in position relative to the sole of a shoe.

From the foregoing it is obvious that I have provided a necessary means attached to a pad to quickly predetermine the exact location of a pad relative to the metatarsal arch and shoe. Also, I have provided a medium attached to a pad which furnishes a definite economical means to retain the pad in place irrespective of heat and moist conditions. These means are susceptible to many modifications all embodying but one invention. These modifications have been disclosed in the present instance to illustrate the simplicity with which metatarsal arch pads may be accurately placed in a shoe and definitely held in place.

While I have shown the preferred form of my invention, it is to be understood that various changes may be made in its construction by those skilled in the art without departing from the spirit of invention, as defined in the appended claims.

I claim:

1. In a device of the character described, the combination comprising a metatarsal arch supporting pad and a measuring and locating means attached to the pad so as to extend rearwardly therefrom in an acute angle relationship with the longitudinal axis of said pad, said means being adapted to be easily detached at any point.

2. In an device of the character described, the combination comprising a metatarsal arch supporting pad and a measuring and locating strip attached to the pad so as to extend rearwardly therefrom in an acute angle relationship with the longitudinal axis of said pad, said strip being adapted to be easily detached at any point, and means to retain the pad in position in a shoe.

3. In a device of the character described, the combination comprising a metatarsal arch supporting pad and a measuring and locating strip attached to the pad so as to extend rearwardly therefrom, said strip being adapted to measure a portion of the foot to predetermine the location of a pad in a shoe at a point beneath the arch, and a plurality of spurs projecting integrally from a plate attached to the under external side of the pad and adapted to make interlocking engagements with the sole of a shoe to prevent the pad from shifting along the sole and means adapted to hold said spurs in contact with the sole and to cooperate with said spurs to secure said pad against the sole, said strip being easily detachable after the pad is secured to the sole.

4. In a device of the character described, the combination with a pad having horizontal surfaces greater than its thickness and adapted to support the metatarsal arch of the foot, a paper-like measuring and locating strip attached to the pad and extending rearwardly therefrom, said strip being adapted to measure a portion of the foot to predetermines the location of the pad in a shoe at a point beneath the arch, said strip being easily detachable after the pad is positioned in the shoe, and means to secure the pad against the sole of the shoe.

5. In a device of the character described, the combination with a pad having horizontal surfaces greater than its thickness and adapted to support the metatarsal arch of the foot, a paper-like measuring and locating strip attached to the pad and extending rearwardly therefrom, said strip being adapted to measure a portion of a foot to predetermine the location of the pad in a shoe at a point beneath the arch, said strip being easily detachable after said pad is secured against the sole of the shoe.

6. In a device of the character described, the combination with a pad having horizontal surfaces greater than its thickness and adapted to support the metatarsal arch of the foot, a measuring and locating means movably attached to the pad and extending rearwardly therefrom, said means being adapted to measure a portion of a foot to predetermine the location of a pad in a shoe beneath the arch, and means on the bottom of said pad adapted to cooperate with the sole of the shoe at a point beneath the arch and the pad to secure said pad there-against, said measuring and locating means being easily movable from the pad after the pad is secured to the sole of the shoe.

7. In a device of the character described, the combination with a pad having horizontal surfaces greater than its thickness and adapted to support the metatarsal arch of the foot, a measuring and locating means comprising a strip having an end portion attached to the pad and a free portion extending rearwardly therefrom, said strip being adapted to measure a portion of a foot to predetermine the location of the pad in a shoe beneath the arch, said strip being easily detachable after the pad is secured in the shoe, and means on the bottom of said pad adapted to cooperate with the sole of the shoe at a point beneath the arch and the pad to secure said pad there-against.

8. In a device of the character described, the combination with a pad having horizontal surfaces greater than its thickness and adapted to support the metatarsal arch of the foot, a graduated measuring and locating strip having an end portion attached to the pad and a free portion extending rearwardly therefrom, said strip adapted to be detached and to measure a portion of a foot from the pad position beneath the arch to a point just back of the heel, the excess portion of the strip extending rearwardly beyond the back of the heel adapted to be disposed of, the pad and strip being adapted to be placed into a shoe with the extreme free end of the strip abutting the most rearwardly inside portion of the heel of the shoe and the pad positioned on the sole of the shoe at a point beneath the arch, and means on the bottom of said pad adapted to cooperate with the sole of the shoe to secure said pad there-against.

LEWIS M. McCORMICK.